United States Patent
Bostick et al.

(10) Patent No.: US 10,025,546 B2
(45) Date of Patent: Jul. 17, 2018

(54) REMOTE DEVICE CONTROL VIA TRANSPARENT DISPLAY

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/798,554

(22) Filed: Jul. 14, 2015

(65) Prior Publication Data

US 2017/0017450 A1  Jan. 19, 2017

(51) Int. Cl.
  *G06F 3/01* (2006.01)
  *G06F 3/14* (2006.01)
  *G06F 3/0488* (2013.01)
  *G09G 5/12* (2006.01)
  *G06F 3/0484* (2013.01)

(52) U.S. Cl.
  CPC ............. *G06F 3/14* (2013.01); *G06F 3/013* (2013.01); *G06F 3/0484* (2013.01); *G06F 3/04883* (2013.01); *G06F 3/1454* (2013.01); *G09G 5/12* (2013.01); *G06F 2203/04803* (2013.01); *G09G 2340/0492* (2013.01); *G09G 2370/02* (2013.01); *G09G 2370/042* (2013.01); *G09G 2370/12* (2013.01); *G09G 2370/16* (2013.01)

(58) Field of Classification Search
  CPC ...... G06F 3/03547; G06F 3/013; G06F 3/015; G06F 3/041; G06F 2203/04108; H04N 21/42207; H04N 21/42209; H04N 21/4222; H04N 21/42224; H04N 21/4223; H04N 21/44218; H04N 21/8186; H04N 21/4221; H04M 1/72533
  See application file for complete search history.

(56) References Cited

U.S. PATENT DOCUMENTS

2014/0075349 A1  3/2014  Yun et al.
2014/0267077 A1  9/2014  Qaddoura
(Continued)

FOREIGN PATENT DOCUMENTS

KR  20140125174 A  10/2014

OTHER PUBLICATIONS

Belley, Corinne et al.; "Activity recognition in smart homes based on electrical devices identification"; Proceedings of the 6th International Conference on PErvasive Technologies Related to Assistive Environments; Article No. 7; Copyright 2013 New York, NY.
(Continued)

*Primary Examiner* — Rinna Yi
(74) *Attorney, Agent, or Firm* — Brian M. Restauro

(57) ABSTRACT

Aspects of the present invention disclose a method for controlling a device remotely. The method includes one or more processors identifying one or more electronic devices, viewed through a transparent display, connected to a network. The method further includes one or more processors determining a first electronic device, from the one or more electronic devices. The method further includes one or more processors mirroring the user interface of the first electronic device on the transparent display.

15 Claims, 4 Drawing Sheets

(56) References Cited

U.S. PATENT DOCUMENTS

2014/0354686 A1* 12/2014 Mullins ............... G06T 19/006
                                                             345/633
2014/0375586 A1   12/2014 de Leon et al.

OTHER PUBLICATIONS

Funamizu, Mac; "Designs for the Better World"; Future of Internet Search: mobile version / petitinvention; pp. 1-4; <https://petitinvention.wordpress.com/2008/02/10/future-of-internet-search-mobile-version/>.

"Intel Technology in Digital Signage"; itechfuture; itechfuture / Future Technology; pp. 1-4; <https://itechfuture.wordpress.com>.

Jeon, Seokhee et al.; "Interaction Techniques in Large Display Environments using Hand-held Devices"; VRST'06; Nov. 1?, 2006; Limassol, Cyprus; Copyright 2006.

Khan, Azam et al.; "A Remote Control Interface for Large Displays"; Alias; UIST '04; Oct. 24-27, 2004; Santa Fe, New Mexico; Copyright 2004.

Malik, Shahzad et al.; "Interacting with Large Displays from a Distance with Vision-Tracked Multi-Finger Gestural Input"; Department of Computer Science, University of Toronto; pp. 43-52; UIST '05; Oct. 23-27, 2005; Seattle, Washington; Copyright 2005.

"TouchPico Projector Turns Any Wall Into a TouchScreen"; Mashable; <http://mashable.com/2014/07/28/touchpico-touchjet/>.

"Object recognition methods in computer vision"; MathWorks; Object Recognition—MATLAB—MathWorks Deutschland; <http://de.mathworks.com/discovery/object-recognition.html?nocookie=ture>.

Myers, Brad A. et al.; "Interacting at a Distance Using Semantic Snarfing"; Carnegie Mellon University Research Showcase @ CMU; Human-Computer Interaction Institute; School of Computer Science.

"How does Google Glass work?"; techlife; Jul. 19, 2013; <http://www.techlife.net/2013/07/how-does-google-lass-work.html/[Mar. 12, 2015 5:05:5 PM].

"Outline of object recognition"; Wikipedia, the free encyclopedia; <http://en.wikipedia.org/wiki/Outline_of_object_recognitition>.

"Object detection"; Wikipedia, the free encyclopedia; <http://en.wikipedia.org/wiki/Object_detection>.

\* cited by examiner

REMOTE DEVICE CONTROL VIA TRANSPARENT DISPLAY

BACKGROUND OF THE INVENTION

The present invention relates generally to the field of remote control devices, and more particularly to controlling one device using another device.

Many of today's electronic devices, such as televisions (TV), digital video recorders (DVR), stereo systems, air conditioning (AC) units, ceiling fans, etc., come equipped with remote controls. However, lost remote controls or inaccessible devices are two problems where an alternate solution to the standard remote control is desirable. A device can be inaccessible for a number of reasons: an individual is bedridden due to an illness or accident; a child cannot reach a device, like a mini-split ductless AC unit, positioned high on a wall; devices are stored in a locked case as a means of loss prevention; etc.

Many other electronic devices, such as smartphones, smartwatches, personal digital assistants (PDA), phablets, tablet computers, etc., do not come equipped with a remote control. Nonetheless, it may be worthwhile to control one of the devices remotely. Consider a retail store selling electronic devices such as smartphones. Merchandise kept in a secure display case is out-of-reach of potential customers. This creates a problem of the potential customers being unable to directly interact with a device under consideration for purchase, which may negatively impact store profit.

Two modes of device to device communication are wired communication and wireless communication. Regarding wired device to device communication technologies, U.S. Patent 20140375586 A1, titled Function of Touch Panel Determined by User Gaze, states the following: "A portable mobile communication device may be connected to an electronic device using one or more wire-based technologies. An example of a wire-based technology is high-definition multimedia interface (HDMI). When the portable mobile communication device is connected to an electronic device, the user interface of the portable mobile communication device may be displayed on the electronic device. A user may interact with the displayed user interface using the portable mobile communication device.

Concerning wireless communication technologies, the referenced U.S. Patent states: "In some embodiments, a portable mobile communication device may be connected to an electronic device using one or more wireless technologies. Exemplary wireless technologies include near-field communication (NFC), infra-red transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless technologies described herein. When a portable mobile communication device is connected to an electronic device either via a wired or wireless technology, the portable mobile communication device may operate in one of two modes."

SUMMARY

Aspects of the present invention disclose a method for controlling a device remotely. In one aspect, the method includes one or more processors identifying one or more electronic devices, viewed through a transparent display, connected to a network. The method further includes one or more processors determining a first electronic device, from the one or more electronic devices. The method further includes one or more processors mirroring the user interface of the first electronic device on the transparent display.

In another aspect, a computer program product includes program instructions to identify one or more electronic devices viewed through a transparent display connected to a network. The computer program product also includes program instructions to determine a first electronic device of the one or more electronic devices. The computer program product also includes program instructions to mirror the user interface of the first electronic device on the transparent display.

In yet another aspect, a computer system includes program instructions to identify one or more electronic devices viewed through a transparent display connected to a network. The computer system also includes program instructions to determine a first electronic device of the one or more electronic devices. The computer system also includes program instructions to mirror the user interface of the first electronic device on the transparent display.

In yet another aspect, a method of determining a first electronic device of the one or more electronic devices includes determining a point of gaze on the transparent display of a user. The method also includes determining a touch point on the transparent display of the user. The method also includes determining a straight line using the point of gaze and the touch point. The method also includes determining the first electronic device of the one or more electronic devices identified by the straight line.

DETAILED DESCRIPTION

Embodiments of the present invention recognize there are instances when controlling an electronic device remotely is beneficial. It may be necessary to keep the electronic device secure or the electronic device may not be readily accessible due to a physical limitation.

Embodiments of the present invention recognize that there may be a need to remotely control an electronic device, even when the device does not have a dedicated remote control. Examples of when this may be necessary are when securing a device from theft or loss, when a device is inaccessible because of its location or a physical limitation, when it is useful to transfer a set of instructions from one device to another device, or any number of similar situations. One embodiment of the present invention allows for selecting an electronic device by simply viewing it in a display and touching the display's touchscreen. This action will load the software necessary to control the selected device to the display. The display is able to control the selected device just as if the device itself was the display. In another embodiment, the display can transfer a set of instructions, for executing a specific task, from one device to another device. One example of when this type of instruction transfer may be helpful is transferring an instruction set, seen on a TV show, for washing a particularly delicate fabric, to a washing machine for later use when washing said fabric.

Figure 1:
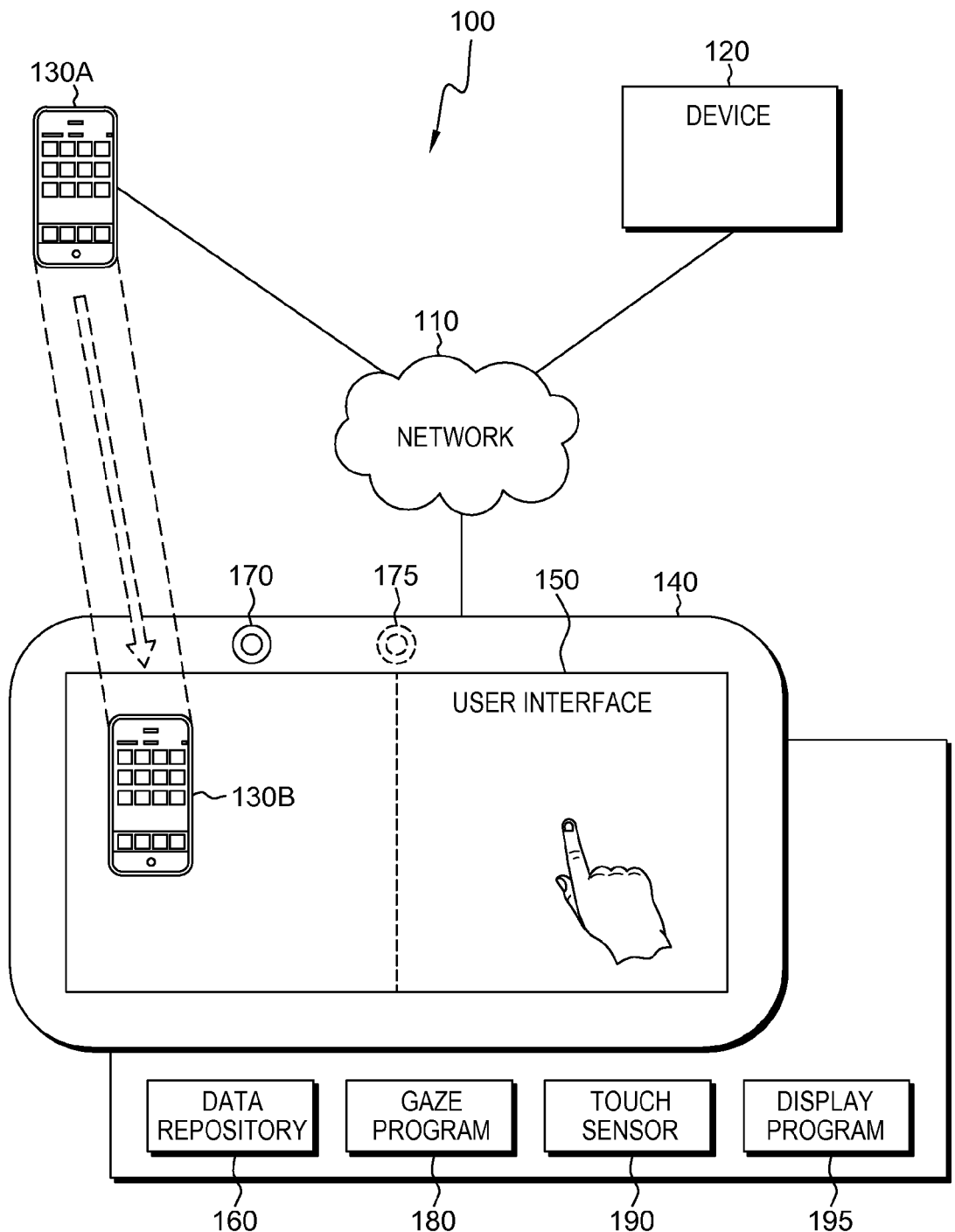
FIG. 1 is a functional block diagram of a computer environment depicting an electronic device with a user interface, in accordance with an embodiment of the present invention.

The present invention will now be described in detail with references to the Figures. FIG. 1 is a functional block diagram of a computer environment, generally designated 100, in accordance with an embodiment of the present invention.

An embodiment of computer environment 100 includes network 110, device 120, device 130A, and transparent display 140 (TD 140). Computer environment 100 can include other computing devices not shown, such as processors, hard drives, read only memory, random access memory, displays, tablet computers, laptop computers, desktop computers, computer servers, or any other computer systems known in the art.

In example embodiments, TD 140 may connect to network 110 which enables TD 140 to access other computing devices and/or data not directly stored to TD 140. Network 110 may be a local area network (LAN), a telecommunications network, a wide area network (WAN) such as the Internet, or any combination of the three, and include wired, wireless or fiber optic connections. In general, network 110 can be any combination of connections and protocols that will support communications between TD 140 and other computing devices, in accordance with embodiments of the present invention.

Device 120 and device 130A are representative electronic devices capable of connecting to network 110. Device 120 and device 130A also include functionality that may be mapped to a touchscreen enabled device, such as TD 140. In one embodiment of the present invention, mapping may be defined as enabling similar function from one device to another device where the second device does not originally include the mapped function. An example of mapping is enabling the touchscreen functions of a smartphone to a different touchscreen device. Examples of device 120 and device 130A include: smartphones; smartwatches; phablets; PDAs; tablet computers; laptop computers; TVs; DVRs; various kitchen electronics (e.g., ovens, convection ovens, microwave ovens, bread makers, mixers, blenders, etc.); other home electronics (e.g., washing machines, dryers, thermostats, HVAC (heating, venting and air conditioning) units, ceiling fans, water heaters, etc.); home automation units; and other similar items. In general, device 120 and device 130A may be any electronic device capable of connecting to a network and having touchscreen functionality.

Replicating some electronic device functions via mapping to a touchscreen may not be easy to accomplish. One such function difficult to replicate may be the use of accelerometers built into a tablet computer. These accelerometers, used in game software to mimic steering, require tilting the tablet left to right and back again. Directly replicating this capability is not straight forward. Two possible options for this, and similar situations, are to disable these features on the touchscreen or to enable them via mapping alternate functions. Consider again the tablet accelerometers; it may be possible to map an outline of the tablet to the touchscreen and "tilt" the tablet by touching the left or right side of the replicate to steer left or right. Another example of a function that cannot be mapped is one that requires additional hardware not found in the touchscreen such as attempting to use the touchscreen as a GPS (Global Positioning System) unit.

Assume, in this example, that TD 140 does not include a GPS chip. Because TD 140 does not include the GPS chip, while the tablet in the above example does, the GPS function cannot be mapped to the touchscreen.

In various embodiments of the present invention, TD 140 is a touchscreen enabled transparent display with the capability to map the touch enabled functions of another electronic device viewed through the transparent display. A touchscreen is an electronic visual display that may allow a user to control a device through simple or multi-touch gestures by touching the screen with a special stylus/pen and/or one or more fingers/fingernails. A touchscreen allows a user to interact directly with what is displayed, rather than using a mouse, touchpad or any other intermediate device (with the exception of a stylus which certain types of touchscreens require). The user may use the touchscreen to react to what is displayed and to control how it is displayed (i.e., increasing the text size to improve readability). In one embodiment, TD 140 may be essentially a transparent piece of glass. In another embodiment, TD 140 may be a transparent piece of glass held by a frame; the frame may be metal, plastic, composite, or another material. In yet another embodiment, TD 140 may be a display case such as those used in a retail environment. An example of this embodiment may be a display case in a store that markets cell phones. TD 140 may include components as depicted and described in further detail with respect to FIG. 3, in accordance with embodiments of the present invention.

TD 140 includes replicate device 130B, user interface 150, data repository 160, front-side image device 170, back-side image device 175, gaze program 180, touch sensor 190, and display program 195. The transparent nature of TD 140 enables a user to look through TD 140 as if the user were looking through glass. In one embodiment of the present invention, TD 140 allows a user to select an electronic device viewed through TD 140 and displayed in user interface 150 by using the features of front-side image device 170, back-side image device 175, gaze program 180, touch sensor 190, and display program 195. In another embodiment, TD 140 may store instructions from a first selected electronic device to data repository 160 and transmit said instructions to a second selected electronic device. In yet another embodiment, TD 140 can execute the replicated touch functions, of a selected electronic device viewed through the display, on user interface 150 using display program 195.

Device 130B is a replicate of device 130A displayed on TD 140, in accordance with embodiments of the present invention. Device 130B replicates all of the functionality of device 130A that is able to be mapped to a touchscreen device such as TD 140. There may be some limitations in the mapped functionality based on the technology found in device 130A. For example, consider viewing a replicate tablet in TD 140. Many touch functions of the original tablet may be mapped to TD 140. Some examples of touch functions that may be mapped include: tapping an icon to open a software application (or 'app'), typing on a virtual keyboard, selecting and playing audio files, using a text editor or spreadsheet program, using a web browser, etc.

In example embodiments, user interface 150, used in conjunction with TD 140, provides an interface between a user of TD 140, network 110 and any other devices connected to network 110. In general, a user interface is the space where interactions between humans and machines occur. User interface 150 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 150 may also be mobile application software that provides an interface between a user of TD 140 and network 110. Mobile application software, or an "app," is a computer program designed to run on smartphones, phablets, tablet computers and other mobile devices. User interface 150 enables a user of TD 140 to receive an indicator of one or more previous viewing locations and a summary of viewing history. In various embodiments of the present invention, it is possible to divide user interface 150 into different and distinct sections. As illustrated in FIG. 1, dividing user interface 150 in half creates two areas in the display. In other embodiments, user interface 150 may display 4 areas (quadrants), 6 areas, or any number of display areas (limited in practicality by the physical size of TD 140 and the resolution of user interface 150). User interface 150 may include an optical coating, an oleophobic coating, a screen protector, or the like, all of which help to mitigate the presence of fingerprints on user interface 150.

In various embodiments, data repository 160 may be storage that may be written to or read by display program 195 for use by display program 195. Data repository 160 may be implemented with various types of storage such as random access memory (RAM), a hard disk drive (HDD), a solid state drive (SSD, flash memory, etc. In one embodiment, data repository 160 resides on TD 140. In alternate embodiments, data repository 160 may also be cloud storage accessed over network 110 or data repository 160 may reside on another computing device within computer environment 100. Device operating instructions, for example, those allowing touch screen enabled functionality, may be stored to data repository 160. For example, instructions for launching a calendar app for a smartphone may be stored to data repository 160.

In example embodiments, front-side image device 170 enables TD 140 to determine the point of gaze of a user of TD 140; i.e., where the user is looking on user interface 150 of TD 140. In one embodiment, front-side image device 170 may be part of a microprojector which transmits an infrared (IR) beam at the eye, and a set of sensors receive the reflection patterns to determine eye position and movement. In another embodiment, front-side image device 170 may be a video camera which receives the reflection patterns from the eye. Video based eye trackers may track corneal reflection and the center of the eye's pupil, may track reflections from the front of the eye's cornea and the back of the eye's lens, or may track features inside the eye, such as retinal blood vessels, as the eye moves. In general, front-side image device 170 is any device capable of tracking eye movement.

In various embodiments of the present invention, back-side image device 175 displays an image of the surrounding environment in user interface 150 on TD 140. Back-side image device 175 shows what electronic devices are in the environment as well as their relative positions to one another. The relative positions of the various electronic devices in the environment provides another form of validation for display program 195 in selecting which electronic device will be controlled by TD 140. Once relative position is determined and stored to data repository 160, the unique identifiers (e.g., IP address, MAC address, etc.) stored in a database (not shown) connected to network 110 are known for each electronic device in the environment. In one embodiment, back-side image device 175 is a camera capable of capturing still images while in another embodiment, back-side image device 175 is a video camera capable of recording video files. Back-side image device 175 allows a user of TD 140 to touch an image shown on TD 140 as a means of selecting an electronic device for remote control. In various embodiments, TD 140 may include one, or more than one, devices such as back-side image device 175. In general, back-side image device 175 is any device capable of displaying an image.

Gaze program 180 is a software application that determines the point of gaze of a user of TD 140 (i.e., where the user is looking on user interface 150 of TD 140) based on the input received by front-side image device 170. In various embodiments, gaze program 180 is included in eye tracker systems, such as front-side image device 170. In other embodiments, gaze program 180 is a stand-alone software program which works in conjunction with front-side image device 170. In general, gaze program 180 is any set of program instructions capable of determining the point of a user's gaze with input from an image device such as front-side image device 170.

According to various embodiments of the present invention, touch sensor 190 is a technology used in conjunction with user interface 150, allowing TD 140 to accept user input. The often used name, known by those skilled in the art, for touch sensor 190 is a touchscreen. Touchscreens are included in many electronic devices such as game consoles, tablet computers, phablets, smartphones, PDAs, and the like. In example embodiments, touch sensor 190 may include the following technologies: resistive; surface acoustic wave; capacitive, including surface capacitance; projected capacitance; mutual capacitance; and self-capacitance; infrared grid; infrared acrylic projection; optical imaging; dispersive signal technology; acoustic pulse recognition; and the like. In one embodiment, touch sensor 190 may include haptic feedback, an example of which is a vibratory response to the touch of user interface 150.

In example embodiments, display program 195 is an application capable of operating a replicated device displayed on user interface 150 of TD 140. Display program 195 may access data repository 160 to locate the device specific instructions to operate the replicated device. Display program 195 may also access a database (not shown) to locate specific electronic device identifiers or operating instructions. In one embodiment, display program 195 may store a file (or files) from device 130A to data repository 160 and subsequently, transfer the file (or files) to device 120 to execute on that device. This process is analogous to a cut and paste operation in a word processing application (copying information from one location and transferring the information to another location). In an example, the file can be an execution file, which is a set of instructions written to perform a specific task; an example discussed later is an energy saving program for a user programmable thermostat.

Figure 2A:
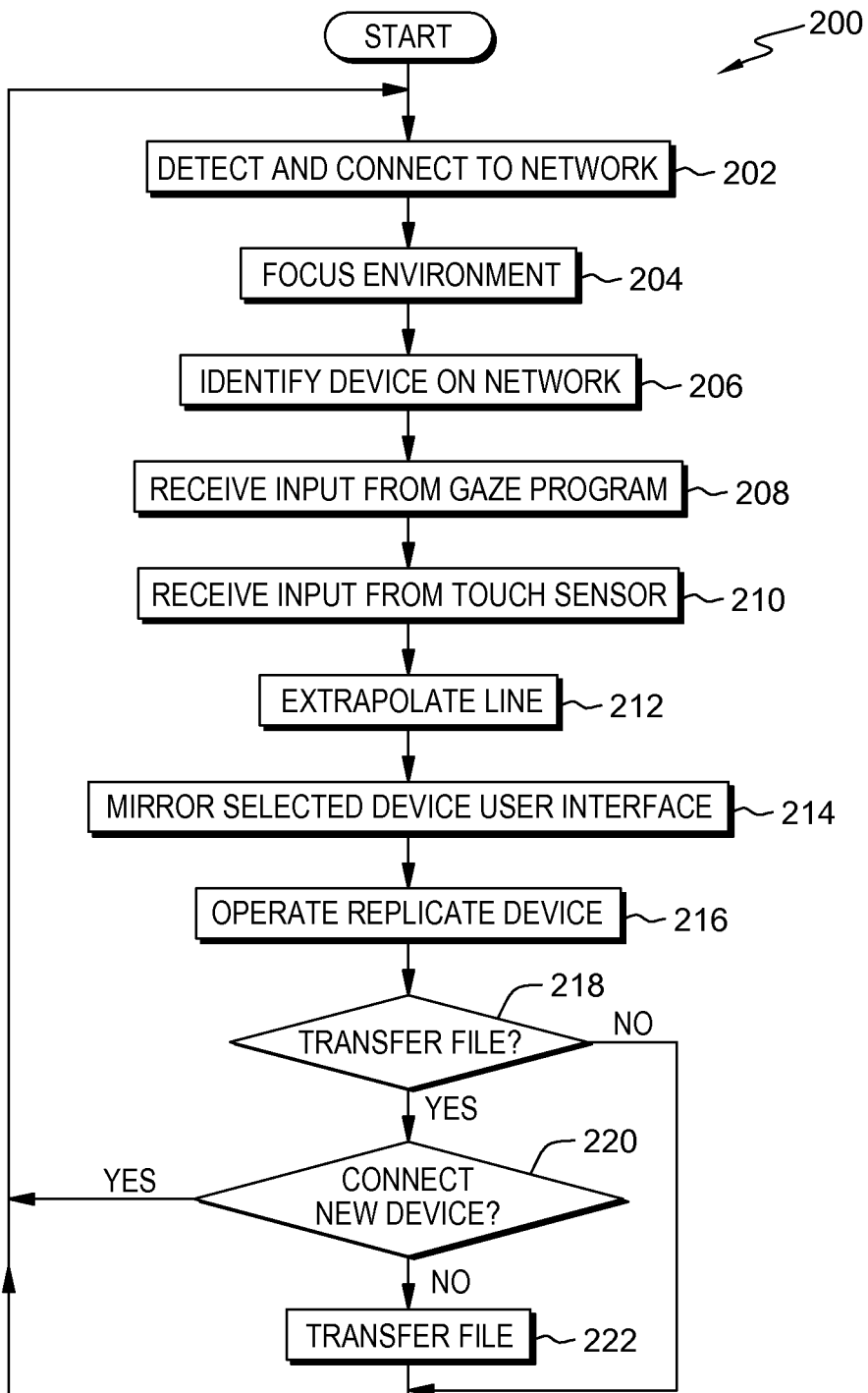
FIG. 2A and FIG. 2B is a flowchart depicting operational steps for selecting a device to replicate on a transparent touchscreen and operating the device remotely with the transparent touchscreen, in accordance with an embodiment of the present invention.
Figure 2B:
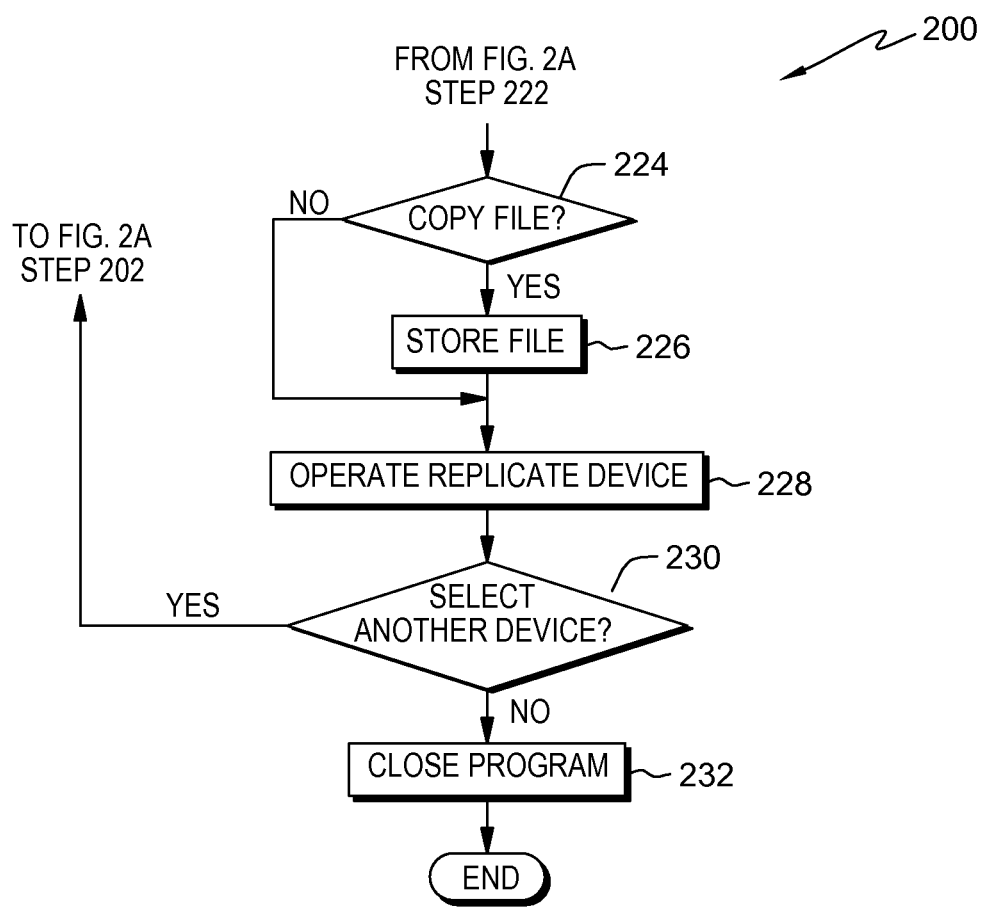

FIG. 2A and FIG. 2B are a flowchart depicting operational steps 200 of display program 195, an application which allows a user of TD 140 to select a device viewed on user interface 150 and to operate functions of the device via user interface 150. In one embodiment display program 195 initiates when TD 140 is powered on. In another embodiment, display program 195 initiates when TD 140 detects devices connected to network 110. In yet another embodiment, a user, via user interface 150, may initiate display program 195 by touching the icon associated with display program 195 on user interface 150.

Display program 195 detects and connects to a network (step 202). In other words, display program 195 may detect what networks are available and connect to them. In one embodiment, display program 195 detects a signal broadcast by network 110, which may be a home based network created by a Wi-Fi router. In another embodiment, display program 195 receives input from touch sensor 190 indicating that a wireless network icon, displayed on user interface 150, has been selected by a user's touch. In response, display program 195 lists available networks. Display program 195 then receives input, from touch sensor 190, of the user selecting one of the available networks by touching that network's icon displayed in user interface 150. Display program 195 then receives input, from touch sensor 190, that the user has entered a security key via a virtual keyboard displayed in user interface 150. Display program 195 then receives input, from touch sensor 190, that the user has touched the area of user interface 150 corresponding to the connect icon for the network. Successfully completing this process connects TD 140 to the selected network.

Display program 195 focuses on the surrounding environment (step 204). In other words, display program 195 receives input from a user of TD 140 to focus back-side image device 175 on the surrounding environment in preparation for selecting an electronic device to be replicated in user interface 150 of TD 140. In one embodiment, back-side image device 175 sends input to display program 195 regarding the environment back-side image device 175 is viewing. In another embodiment, back-side image device 175 is one of a plurality of image devices on a display case in a retail environment. In an example, a user focuses TD 140 on a smartphone and a tablet computer sitting on the coffee table in the user's living room.

Display program 195 identifies devices on the network (step 206). In other words, display program 195 identifies electronic devices connected to the network and attempts to establish a link between the electronic devices and TD 140. In an embodiment of the present invention, display program 195 receives input identifying electronic devices connected to network 110. In one embodiment, if no security key is required, display program 195 may immediately establish a link to an electronic device. In another embodiment, display program 195 receives input from an electronic device that a security key is required. Display program 195 then receives the necessary credentials (e.g., IP address, MAC address, hostname, User ID, password, etc.), via touch sensor 190 registering touches on a virtual keyboard displayed on user interface 150, to establish the link. The IP address for a given electronic device may be found in the details of the electronic device's network connection and the MAC address may be found in the details of the electronic device's local area connection. In an example, a user of TD 140 defines a smartphone by its IP address and enters a user ID and password, as needed.

Display program 195 receives input from gaze program 180 (step 208). In other words, gaze program 180 determines the point of gaze on TD 140 by a user and sends that input to display program 195. In an example embodiment, a video camera, such as front-side image device 170, tracks the user's eye movements to determine where the user is looking on TD 140. In one example, the user is looking at a smartphone through TD 140. The smartphone, connected to the same Wi-Fi network as TD 140, is displaying a program for a programmable thermostat.

Display program 195 receives input from touch sensor 190 (step 210). In other words, touch sensor 190 determines the x-y coordinates of a user's touch contact point on user interface 150 and sends that input to display program 195. In an embodiment of the present invention, a capacitive touchscreen detects a user's touch because of the conductive nature of the human body. The user's touch distorts the electrostatic field of the touchscreen measured by a change in capacitance. Touch sensor 190 determines the location of the touch by the user and sends the information to display program 195. In an example, a user of TD 140 touches the point on user interface 150 that corresponds to the location that the user is looking through TD 140 to see a smartphone behind TD 140.

Display program 195 extrapolates a straight line (step 212). In other words, display program 195 creates a straight line between the two points created by the point of gaze determined in step 208 and the touch contact point determined in step 210. From this extrapolation, display program 195 determines the electronic device a user of TD 140 is viewing. Display program 195 recognizes the electronic device by using one of any number of object recognition techniques available. Object recognition, or object detection, is a computer technology concerning computer vision and image processing related to detecting instances of objects of a certain class. In one embodiment, display program 195 receives input from gaze program 180 and touch sensor 190 establishing the two points to create the extrapolation. In an example, display program 195 determines a user is viewing a smartphone through TD 140 by extrapolating the line created by the two points and determining that the line intersects the smartphone.

Display program 195 mirrors the selected electronic device's user interface (step 214). In other words, the selected electronic device displays its user interface and display program 195 mirrors a copy of this user interface on user interface 150 of TD 140. In one embodiment, the mirrored user interface may be an exact copy while in alternative embodiments, the mirrored user interface may be substantially similar. This enables a user of TD 140 to control the replicated device using only TD 140 without physically handling the replicated device itself. Mirroring, which may be defined as displaying the content of a first device (the selected electronic device) on a second device (TD 140), requires the use of the first device's program software by the second device. In one embodiment, the program software is preloaded to data repository 160 for use by TD 140 while in another embodiment, the selected electronic device's program software is loaded to user interface 150 directly from the replicated device. In yet another embodiment, the program software is loaded from a database (not shown) connected to network 110. In various embodiments of the present invention, TD 140 communicates with the selected electronic device using Wi-Fi, Bluetooth, Near Field Communication (NFC), or any other available wireless communication technology. In an example, the program software for a smartphone, viewed through TD 140, is loaded to TD 140 allowing remote control of the smartphone using the smartphone's mirrored user interface on user interface 150 of TD 140.

Display program 195 operates the replicate device (step 216). In other words, a user of TD 140 controls the replicated device via display program 195; the selected electronic device is replicated on TD 140 and displayed on user interface 150. In one embodiment, display program 195 receives input, via user interface 150, to open an application on the replicated device. In an example, a user of TD 140 is able to open a smartphone's contact list or launch its calendar app through user interface 150 on TD 140. In another example, the user may launch the browser on the smartphone, use a search function to find a video tutorial for using a programmable thermostat and watch the video, all by controlling the actual smartphone through the replicated smartphone displayed in user interface 150 on TD 140.

Display program 195 determines whether to transfer a file or files (decision step 218). In other words, display program 195 receives input from a user of TD 140, via user interface 150, whether to transfer any files that have been previously stored to data repository 160 or any other storage device. The files may have been copied earlier from other replicated devices for later transfer to another replicated device. In one embodiment, (decision step 218, NO branch), the available file will not be copied for subsequent transfer; therefore, display program 195 proceeds directly to step 224. In another embodiment, (decision step 218, YES branch), a file will be copied for subsequent transfer; display program 195 then proceeds to step 220.

Display program 195 determines whether to connect to a new device (decision step 220). In other words, display program 195 receives input from a user of TD 140, via user interface 150, whether to connect to a new electronic device. In one embodiment, the new electronic device is connected to network 110. In another embodiment, the new electronic device is on a different network. In one embodiment (decision step 220, NO branch), display program 195 does not receive an indication from a user of TD 140 to connect to a new electronic device; therefore, display program 195 proceeds to step 222. In another embodiment (decision step 220, YES branch), display program 195 receives input from a user of TD 140 to connect to a new electronic device, display program 195 then proceeds to step 202. In one embodiment, the currently selected device replicated in TD 140 will remain active (i.e., will remain replicated in TD 140 which allows control of the replicated device via user interface 150). This will result in multiple replicated devices on TD 140 (after the new electronic device is replicated). In another embodiment, the currently selected device replicated in TD 140 will be disconnected resulting in TD 140 losing control capability of that replicated device.

Display program 195 transfers a file or files (step 222). In other words, display program 195 receives input from a user of TD 140, via user interface 150, that a file or files stored in data repository 160 or stored in another storage device will be transferred to another electronic device. In one embodiment, the file or files are transferred to the currently replicated device on TD 140. The files, therefore, were previously copied from a different electronic device that, at one time, was replicated on TD 140. In another embodiment, the files are transferred to an electronic device not currently replicated on TD 140. This first requires that a connection is made to a new electronic device (decision step 220, YES branch). In yet another embodiment, multiple electronic devices are currently replicated on TD 140 so the file or files can be transferred directly between the electronic devices.

Display program 195 determines whether to copy a file (decision step 224). In other words, display program 195 receives input that a selected electronic device, controlled by TD 140, includes a file. In one embodiment, (decision step 224, NO branch), the available file will not be copied; therefore, display program 195 proceeds directly to step 228. In another embodiment, (decision step 224, YES branch), a file will be copied; display program 195 then proceeds to step 226.

Display program 195 stores a file (step 226). In other words, display program 195 receives input from a user of TD 140 to store a file. In one embodiment, display program 195 receives input from a user of TD 140 to store a file (or files) to data repository 160 for later use or later transfer to another electronic device. In various embodiment, the file or files to be stored may be stored to any storage device connected to network 110. In an example, a user of TD 140 finds an execution file, outlining a program, in a video tutorial for using a programmable thermostat, and stores the execution file to data repository 160 to later transfer to a programmable thermostat. In another example, a user of TD 140 stores music files to data repository 160. This example illustrates that not all files stored on TD 140 must later be transferred to another electronic device but rather may be used directly by TD 140.

Display program 195 operates the replicate device(s) (step 228). In other words, a user of TD 140 controls the selected electronic device(s) via display program 195; the selected electronic device is (or devices are) replicated on TD 140 and displayed on user interface 150. In one embodiment, display program 195 receives input to load a smartphone's program software to user interface 150. In an example, a user of TD 140 is able to open a smartphone's contact list or launch its calendar app through user interface 150 on TD 140. In another example, the user may launch the browser on the smartphone, use a search function to find a video tutorial for using a programmable thermostat and watch the video, all by controlling the actual smartphone through the replicated smartphone displayed in user interface 150 on TD 140.

Display program 195 determines whether to select another device (decision step 230). In other words, display program 195 receives input, from a user of TD 140, regarding the selection of another device for control by TD 140. In one embodiment, (decision step 230, YES branch), display program 195 receives input to select another device for remote control by TD 140 so display program 195 proceeds to step 202. In an example, a user of TD 140 intends to transfer an execution file for a programmable thermostat so the user locates the programmable thermostat on the network, gains control of a replicated version of the programmable thermostat using steps 202-216, inclusive. The user is then able to transfer the execution file, stored in data repository 160, to the programmable thermostat using only TD 140 and not physically touching the programmable thermostat. In another embodiment, (decision step 230, NO branch), display program 195 does not receive input to select another device for remote control so display program 195 proceeds to step 232. In an embodiment of the present invention, the currently selected device replicated in TD 140 will remain active (i.e., will remain replicated in TD 140 which allows control of the replicated device via user interface 150). This will result in multiple replicated devices on TD 140 (after the new electronic device is replicated). In another embodiment, the currently selected device replicated in TD 140 will be disconnected resulting in TD 140 losing control capability of that replicated device. In an example, the user of TD 140 continues to work with a smartphone's calendar app via the replicate displayed in user interface 150 on TD 140 while in another example, the smartphone replicate is disconnected so remote control of the smartphone is lost.

Display program 195 closes the program (step 232). In other words, display program 195 continues to operate any selected electronic devices via TD 140 until a user of TD 140 closes display program 195. In one embodiment, display program 195 continues to control the replicated smartphone via TD 140. In an example, a user of TD 140 is able to open a smartphone's contact list or launch its calendar app through user interface 150 on TD 140. In another example, the user may launch a browser on the smartphone, use a search function to find a video tutorial for using a programmable thermostat and watch the video, all by controlling the actual smartphone through the replicated smartphone displayed in user interface 150 on TD 140. In another embodiment, a user of TD 140 closes display program 195. In an example, control of any replicated devices linked to TD 140 is lost.

Figure 3:
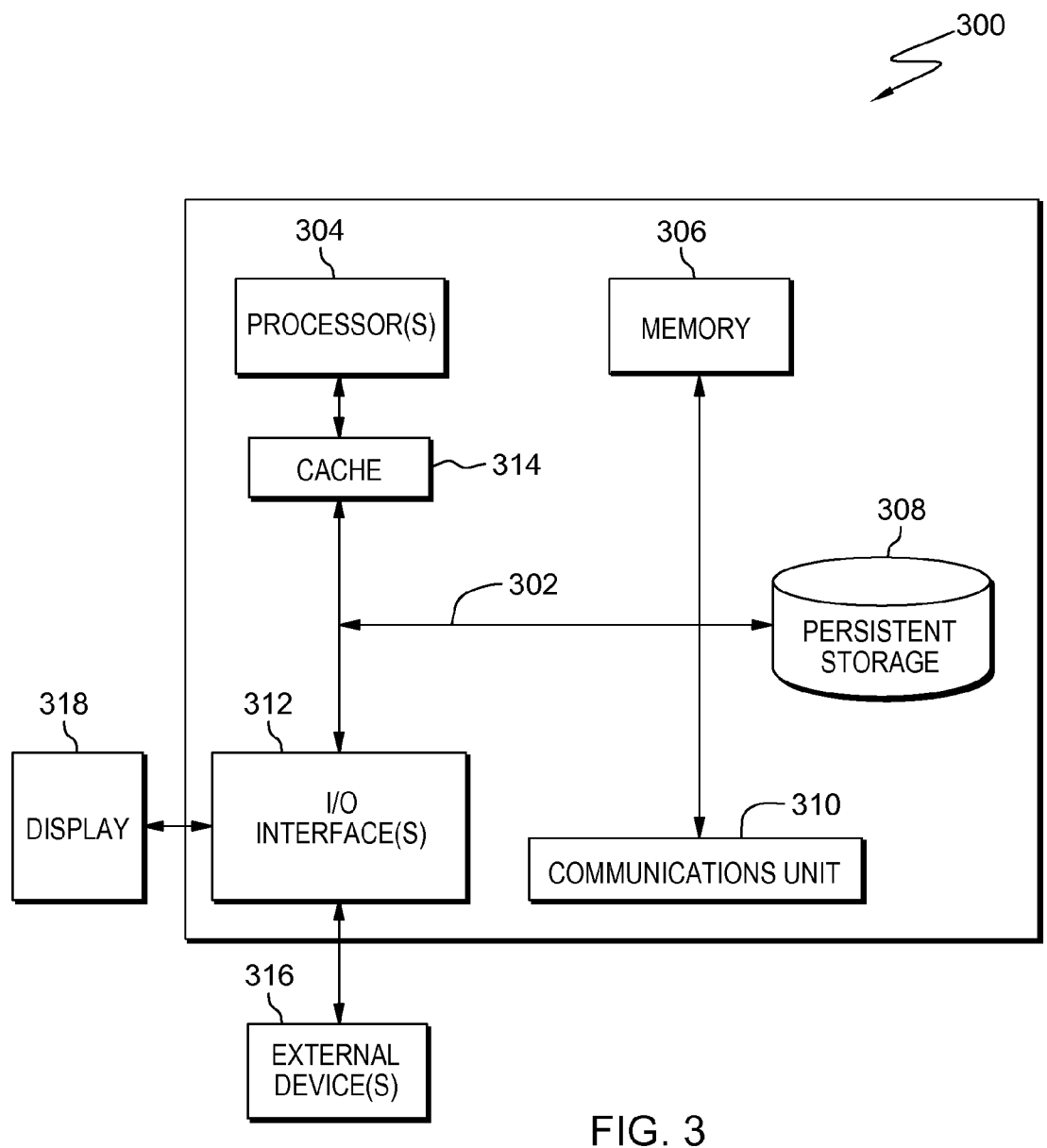
FIG. 3 is a block diagram of the components of a computing system representative of the electronic device of FIG. 1, in accordance with an embodiment of the present invention.

FIG. 3 depicts computer system 300, that is an example of a system that includes TD 140. Computer system 300 includes processors 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 314. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 316 such as a keyboard, keypad, a touch screen, and/or some other suitable input device. External devices 316 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to display 318.

Display 318 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for controlling a device remotely, the method comprising:
    identifying, by one or more processors, a plurality of electronic devices, viewed through a transparent display having touch functionality, connected to a network, wherein the transparent display allows a user to view each electronic device of the plurality of electronic devices through the transparent display:
    selecting, by one or more processors, a first electronic device of the plurality of electronic devices by:
        receiving a plurality of inputs from the user on the transparent display;
        determining a point of gaze of the user on the transparent display based on the received plurality of inputs;
        determining a touch point on the transparent display based on the received plurality of inputs;
        extrapolating a straight line between the determined point of gaze and the touch point determined on the transparent display; and
        selecting the first electronic device intersected by the extrapolated straight line through the transparent display:
    identifying, by one or more processors, the selected first electronic device via object recognition;
    mirroring, by one or more processors, a user interface of the identified first electronic device and displaying content of the first electronic device on the mirrored user interface of the first electronic device displayed on the transparent display using program software of the first electronic device, wherein the mirrored user interface is a copy of the user interface of the first electronic device that copies all functionality of the first electronic device and maps to the transparent display,
    wherein program software of the first electronic device, viewed through the transparent display, is loaded to the transparent display from the copy of the user interface of the first electronic device, or from a database connected to the network, and
    the mirrored user interface of the first electronic device displayed on the transparent display allows the user to remotely control the first electronic device viewed through the transparent display.

2. The method of claim 1, further comprising:
    storing, by one or more processors, a set of data from the first electronic device on the transparent display.

3. The method of claim 2, further comprising:
- selecting, by one or more processors, a second electronic device of the plurality of electronic devices;
- mirroring, by one or more processors, a user interface of the second electronic device on the transparent display; and
- transferring, by one or more processors, the set of data to the second electronic device.

4. The method of claim 1, wherein the step of determining a point of gaze of the user on the transparent display based on the received plurality of inputs, comprises:
- receiving, by one or more processors, a set of input data from an image device; and
- processing, by one or more processors, the set of input data to determine the point of gaze on the transparent display.

5. The method of claim 1, wherein the step of determining the touch point on the transparent display based on the received plurality of inputs, comprises:
- receiving a set of input data from a touch sensor; and
- processing the set of input data to determine the touch point on the transparent display.

6. A computer program product for controlling a device remotely, the computer program product comprising:
- one or more computer readable hardware storage media; and
- program instructions stored on the one or more computer readable hardware storage media for execution by at least one or more computer processors, the program instructions comprising:
- program instructions to identify a plurality of electronic devices, viewed through a transparent display having touch functionality, connected to a network, wherein the transparent display allows a user to view each electronic device of the plurality of electronic devices through the transparent display;
- program instructions to select a first electronic device of the plurality of electronic devices, wherein the program instructions to select a first electronic device of the plurality of electronic devices comprise:
  - program instructions to receive a plurality of inputs from the user on the transparent display;
  - program instructions to determine a point of gaze of the user on the transparent display based on the received plurality of inputs;
  - program instructions to determine a touch point on the transparent display based on the received plurality of inputs;
  - program instructions to extrapolate a straight line between the point of gaze and the touch point determined on the transparent display; and
  - program instructions to select the first electronic device intersected by the extrapolated straight line through the transparent display;
- program instructions to identify the selected first electronic device via object recognition;
- program instructions to mirror a user interface of the identified first electronic device and displaying content of the first electronic device on the mirrored user interface of the first electronic device displayed on the transparent display using program software of the first electronic device, wherein the mirrored user interface is a copy of the user interface of the first electronic device that copies all functionality of the first electronic device and maps to the transparent display,
  - wherein program software of the first electronic device, viewed through the transparent display, is loaded to the transparent display from the copy of the user interface of the first electronic device, or from a database connected to the network, and
  - the mirrored user interface of the first electronic device displayed on the transparent display allows the user to remotely control the first electronic device viewed through the transparent display.

7. The computer program product of claim 6, further comprising program instructions, stored on the one or more computer readable hardware storage media, to:
- store a set of data from the first electronic device on the transparent display.

8. The computer program product of claim 7, further comprising program instructions, stored on the one or more computer readable hardware storage media, to:
- select a second electronic device of the plurality of electronic devices;
- mirror a user interface of the second electronic device on the transparent display; and
- transfer the set of data to the second electronic device.

9. The computer program product of claim 6, wherein the program instructions to determine a point of gaze of the user on the transparent display based on the received plurality of inputs, comprises:
- program instructions to receive a set of input data from an image device; and
- program instructions to process the set of input data to determine the point of gaze on the transparent display.

10. The computer program product of claim 6, wherein the program instructions to determine the touch point on the transparent display, based on the received plurality of inputs, comprise:
- program instructions to receive a set of input data from a touch sensor; and
- program instructions to process the set of input data to determine the touch point on the transparent display.

11. A computer system for controlling a device remotely, the computer system comprising:
- one or more computer processors;
- one or more computer readable hardware storage media; and
- program instructions stored on the one or more computer readable hardware storage media for execution by at least one of the one or more computer processors, the program instructions comprising:
- program instructions to identify a plurality of electronic devices, viewed through a transparent display having touch functionality, connected to a network, wherein the transparent display allows a user to view each electronic device of the plurality of electronic devices through the transparent display;
- program instructions to select a first electronic device of the plurality of electronic devices, wherein the program instructions to select a first electronic device of the plurality of electronic devices comprise:
  - program instructions to receive a plurality of inputs from the user on the transparent display;
  - program instructions to determine a point of gaze of the user on the transparent display based on the received plurality of inputs;
  - program instructions to determine a touch point on the transparent display based on the received plurality of inputs;
  - program instructions to extrapolate a straight line between the point of gaze and the touch point determined on the transparent display; and program instructions to select the first electronic device intersected by the extrapolated straight line through the transparent display;

program instructions to identify the selected first electronic device via object recognition;

program instructions to mirror a user interface of the identified first electronic device and display content of the first electronic device on the mirrored user interface of the first electronic device displayed on the transparent display using program software of the first electronic device, wherein the mirrored user interface is a copy of the user interface of the first electronic device that copies all functionality of the first electronic device and maps to the transparent display, wherein program software of the first electronic device, viewed through the transparent display, is loaded to the transparent display from the copy of the user interface of the first electronic device, or from a database connected to the network, and the mirrored user interface of the first electronic device displayed on the transparent display allows the user to remotely control the first electronic device viewed through the transparent display.

12. The computer system of claim 11, further comprising program instructions, stored on the one or more computer readable hardware storage media for execution by at least one of the one or more computer processors, to:

store a set of data from the first electronic device on the transparent display.

13. The computer system of claim 12, further comprising program instructions, stored on the one or more computer readable hardware storage media for execution by at least one of the one or more computer processors, to:

select a second electronic device of the plurality of electronic devices;

mirror a user interface of the second electronic device on the transparent display; and transfer the set of data to the second electronic device.

14. The computer system of claim 11, wherein the program instructions to determine a point of gaze of the user on the transparent display based on the received plurality of inputs, comprise:

program instructions to receive a set of input data from an image device; and program instructions to process the set of input data to determine the point of gaze on the transparent display.

15. The computer system of claim 11, wherein the program instructions to determine a touch point on the transparent display based on the received plurality of inputs, comprise:

program instructions to receive a set of input data from a touch sensor; and program instructions to process the set of input data to determine the touch point on the transparent display.

* * * * *